(No Model.)
T. A. WILLSON & G. W. MEIGS.
SPECTACLES AND EYEGLASSES.
No. 289,740. Patented Dec. 4, 1883.
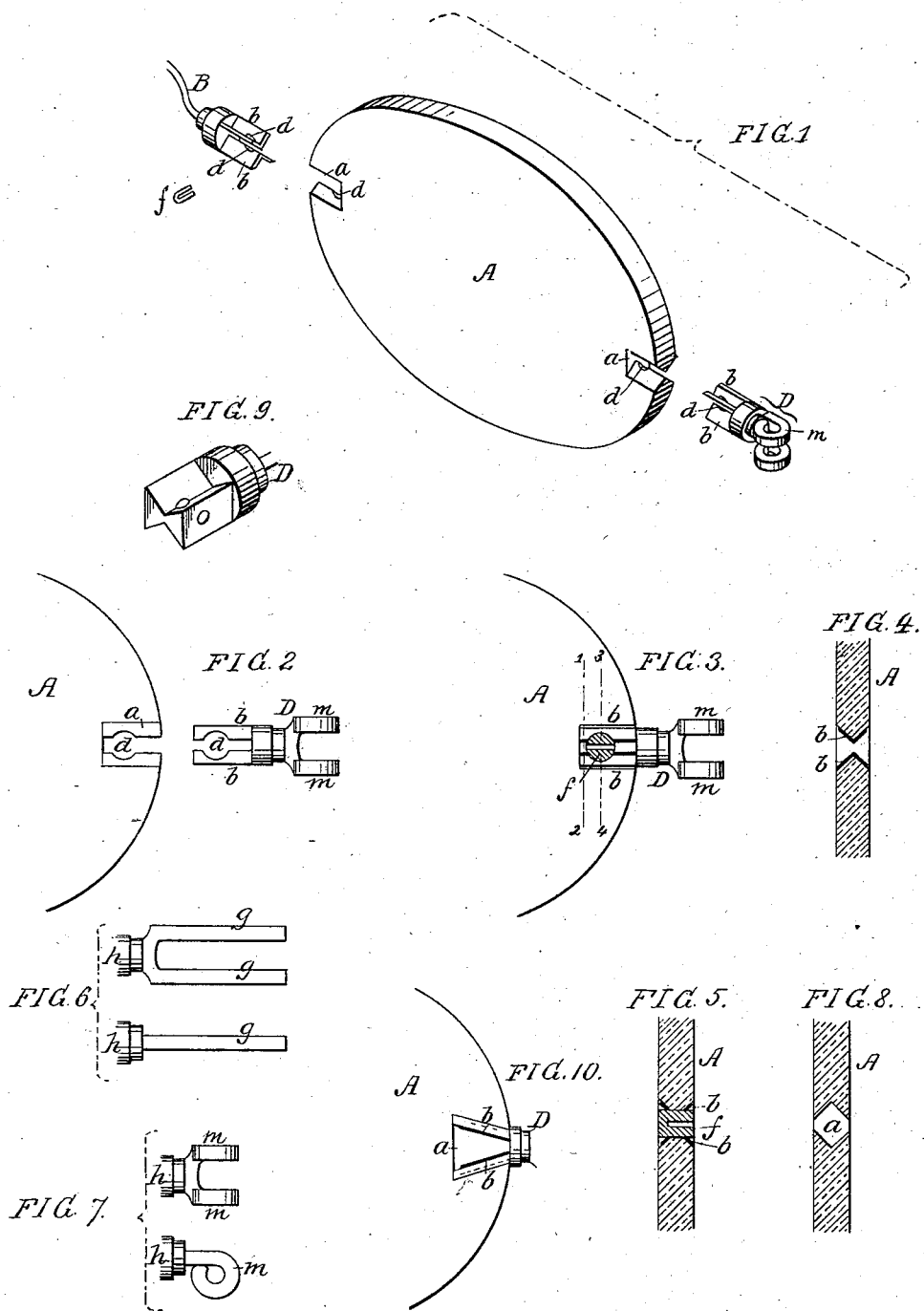
WITNESSES:
David Williams
Hamilton D. Turner
INVENTOR:
Thomas A. Willson
and
George W. Meigs.
by their Attorneys.
Howsen & Sons

UNITED STATES PATENT OFFICE.

THOMAS A. WILLSON AND GEORGE W. MEIGS, OF READING, PENNSYLVANIA, ASSIGNORS TO SAID WILLSON.

SPECTACLES AND EYEGLASSES.

SPECIFICATION forming part of Letters Patent No. 289,740, dated December 4, 1883.

Application filed May 14, 1883. (No model.)

*To all whom it may concern:*

Be it known that we, THOMAS A. WILLSON and GEORGE W. MEIGS, citizens of the United States, and residents of Reading, Pennsylvania, have invented certain Improvements in Spectacles and Eyeglasses, of which the following is a specification.

The objects of our invention are to provide a simple means of firmly securing the nose-piece or end pieces to the lenses of rimless spectacles or eyeglasses, and to improve the construction of that portion of the end piece which carries the pivot-pin for the temple.

In the accompanying drawings, Figure 1 is a perspective view, drawn to an enlarged scale, of one of the lenses of a pair of rimless spectacles, with part of the nose-piece and one of the end pieces, the whole being constructed in accordance with our invention. Fig. 2 is a side view of the end piece and part of the lens, the end piece being detached; Fig. 3, the same with the end piece secured in place; Fig. 4, a transverse section on the line 1 2, Fig. 3; Fig. 5, a transverse section on the line 3 4, Fig. 3; Figs. 6 and 7, views illustrating the mode of forming the eye on the end piece, and Figs. 8 to 10 modifications.

A represents one of the lenses of a pair of spectacles, B part of the nose-piece, and D one of the end pieces. In each end of the lens is formed a recess, *a*, with opposite laterally-beveled edges, and secured to the nose-piece and end piece are projections adapted to said recesses, each projection comprising a pair of V-shaped ribs, *b*. These ribs may be so constructed that when they have been thrust into the recess they cannot be withdrawn without an effort, and this frictional contact may be relied upon to prevent the withdrawal of the attachment, whether end piece or nose-piece; but for additional security we prefer to form in the ribs *b* and recess *a* recesses *d d*, which, when the parts are fitted together, as shown in Fig. 3, coincide with each other, and form an opening for the reception of the transverse pin *f*, which is preferably split throughout a portion of its length, so as to possess inherent elasticity sufficient to retain it in place.

The opposite edges of the recess *a* may be rounded instead of V-shaped, or may have beveled grooves, as shown in Fig. 8, instead of V-shaped projections, and where we use the term "beveled edges" we wish it to be understood as including either of these forms.

A single projection having beveled or recessed edges adapted to those of the recess *a* may, if desired, be used in place of the two ribs *b*, as shown in Fig. 9, for instance; or, where the ribs are employed, the recess *a* may be flared and the ribs expanded into the same, as shown in Fig. 10, the use of the pin *d* in this case not being necessary.

We make the end piece and form an eye upon it in the following manner: A forked projection, *g*, Fig. 6, is first formed on the stem *h*, and the arms of this projection are then bent, as shown in Fig. 7, so as to form a forked eye, *m*, adapted for the reception of the temple-eye and its pivot-pin. The eye *m* may be secured by solder or otherwise after being bent, so as to hold the pivot-pin firmly when the temple is so constructed as to turn on the pin; but when the pivot-pin is secured to the temple we do not secure the bent arms, but permit them to form an elastic eye, which will permit the free turning of the pivot-pin with the temple, but will prevent any slip.

An elastic eye may be formed on the end piece by boring and slotting a solid lug thereon, or by slotting the lugs of the usual two-part eye; but the plan described of bending a projection to form the eye is preferred on the score of economy. A single projection, however, may be used instead of the forked projection, in which case the eye on the temple is preferably forked.

The recesses *a* can be readily formed in the lens when the lens-blanks are made by pressing the glass in a mold in the manner set forth in T. A. Willson's Patent No. 265,206, dated September 26, 1882. By forming the recess *a* with one or both of its edges laterally beveled, as described, the lateral displacement of either end piece or nose-piece is prevented without the necessity of forming upon the clips unsightly wings or ears to overlap the sides of the lens.

We claim as our invention—

1. A spectacle or eyeglass lens having in the end a single recess, *a*, with lateral bevel, as described.

2. The combination of the lens having in the end a single recess, a, with lateral bevel, with an attachment having a projection beveled to fit said single recess, as set forth.

3. The combination of the lens having in the end a recess, a, with lateral bevel, with an attachment having ribs b, beveled to fit the recess, as set forth.

4. The combination of the lens having in the end a recess, a, with lateral bevel, the attachment having a projection adapted to said recess, and a transverse retaining-pin, f, adapted to recesses d in the recess a and projection, as set forth.

5. The combination of the lens having in the end a recess, a, with lateral bevel, the attachment having a projection adapted to said recess, and a split transverse retaining-pin, f, as set forth.

6. A spectacle end piece having thereon an elastic eye, m, for the reception of the pivot-pin of the temple, as set forth.

7. An end piece, D, for spectacles, having a projection bent to form an eye, m, adapted for the reception of the pivot-pin of the temple, as set forth.

In testimony whereof we have signed our names to this specification in the presence of two subscribing witnesses.

THOMAS A. WILLSON.
GEORGE W. MEIGS.

Witnesses:
J. V. KENDALL,
JOSEPH A. ALLGAIER.